US011836914B2

(12) United States Patent
Hara et al.

(10) Patent No.: US 11,836,914 B2
(45) Date of Patent: Dec. 5, 2023

(54) INFORMATION PROCESSING METHOD AND INFORMATION PROCESSING DEVICE FOR DETECTING A TRACE FORMED ON A SURFACE OF A WORKPIECE

(71) Applicant: Panasonic Intellectual Property Management Co., Ltd., Osaka (JP)

(72) Inventors: Nobuo Hara, Osaka (JP); Takeshi Yamasaki, Osaka (JP); Koichi Wakitani, Toyama (JP); Tomoyuki Ishikawa, Yamaguchi (JP); Seita Takahashi, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 252 days.

(21) Appl. No.: 17/395,966

(22) Filed: Aug. 6, 2021

(65) Prior Publication Data
US 2022/0084177 A1 Mar. 17, 2022

(30) Foreign Application Priority Data

Sep. 11, 2020 (JP) .................................. 2020-153369

(51) Int. Cl.
*G06K 9/00* (2022.01)
*G06T 7/00* (2017.01)
(Continued)

(52) U.S. Cl.
CPC ............ *G06T 7/001* (2013.01); *G06T 7/0006* (2013.01); *G06T 7/74* (2017.01); *G06V 10/42* (2022.01);
(Continued)

(58) Field of Classification Search
CPC ......... G06T 7/001; G06T 7/0006; G06T 7/74; G06T 2207/30164; G06V 10/42; G06V 10/98; G06V 2201/06
See application file for complete search history.

(56) References Cited

U.S. PATENT DOCUMENTS

| 6,320,655 | B1 * | 11/2001 | Matsushita | ........ | G01N 21/9501 |
| | | | | | 356/614 |
| 8,275,190 | B2 * | 9/2012 | Sakai | ...................... | G06T 7/001 |
| | | | | | 700/121 |

(Continued)

FOREIGN PATENT DOCUMENTS

| CN | 106426161 A | * | 2/2017 | ............ B25J 19/023 |
| JP | 2000-269286 | | 9/2000 | |

(Continued)

OTHER PUBLICATIONS

Region adaptive scheduling for time-dependent processes with optimal use of machine dynamics, Yanjun Han et al., Elsevier, 2020, pp. 1-17 (Year: 2020).*

(Continued)

*Primary Examiner* — Jayesh A Patel
(74) *Attorney, Agent, or Firm* — Wenderoth, Lind & Ponack, L.L.P.

(57) ABSTRACT

An information processing method calculates a position of a feature corresponding to a trace in a first coordinate system, calculates a position of the feature corresponding to the trace in a second coordinate system, and calculates a size of a first distribution of the position of the feature corresponding to the trace in the first coordinate system and a size of a second distribution of the position of the feature corresponding to the trace in the second coordinate system. Additionally, the information processing method outputs information indicating that the feature corresponding to the trace is the trace formed on the surface of the workpiece in the machining (Continued)

process, and outputs information indicating that the feature corresponding to the trace is a false detection of the trace in the inspection process.

5 Claims, 7 Drawing Sheets

(51) Int. Cl.
*G06T 7/73* (2017.01)
*G06V 10/42* (2022.01)
*G06V 10/98* (2022.01)

(52) U.S. Cl.
CPC .... *G06V 10/98* (2022.01); *G06T 2207/30164* (2013.01); *G06V 2201/06* (2022.01)

(56) References Cited

U.S. PATENT DOCUMENTS

| | | | | |
|---|---|---|---|---|
| 10,699,400 | B2 * | 6/2020 | Hori | G06T 7/0004 |
| 2003/0198374 | A1 * | 10/2003 | Hagene | G01N 21/954 |
| | | | | 382/141 |
| 2004/0044484 | A1 * | 3/2004 | Obara | H01L 21/67253 |
| | | | | 702/35 |
| 2004/0218808 | A1 * | 11/2004 | Prince | H05K 3/1216 |
| | | | | 382/150 |
| 2013/0114878 | A1 * | 5/2013 | Scheid | G06T 7/001 |
| | | | | 382/141 |
| 2019/0188845 | A1 * | 6/2019 | Tamai | G06V 10/87 |
| 2019/0325601 | A1 * | 10/2019 | Chen | G06T 7/80 |

FOREIGN PATENT DOCUMENTS

| | | | | |
|---|---|---|---|---|
| JP | 2001-176941 | | 6/2001 | |
| JP | 2004050390 | A * | 2/2004 | ............ B25J 9/1697 |
| JP | 2004-153228 | | 5/2004 | |
| JP | 2004153228 | A * | 5/2004 | ....... H01L 21/67253 |
| JP | 2009-025004 | | 2/2009 | |
| JP | 2020101900 | A * | 7/2020 | ............ G06K 9/2054 |
| WO | WO-2007120279 | A2 * | 10/2007 | ......... G01N 21/9501 |

OTHER PUBLICATIONS

A Comparative Study of Machine Vision Based Methods for Fault Detection in an Automated Assembly Machine, Vedang Chauhan, et al., Elsevier, 2015, pp. 416-426 (Year: 2015).*
Performance Evaluation of MVI for Fault Detection in Automated Assembly Machines, Vedang Chauhan et al., IEEE, 2016, pp. 214-219 (Year: 2016).*
Detection of a casting defect tracked by deep convolution neural network, Jinhua Lin et al., Springer, 2018, pp. 573-581 (Year: 2018).*

* cited by examiner

FIG. 7

|  | Position coordinates (X, Y) of chuck in relative coordinate system |
|---|---|
| First machining equipment | (10,10) |
| Second machining equipment | (100,100) |
| Third machining equipment | (150,150) |

US 11,836,914 B2

INFORMATION PROCESSING METHOD AND INFORMATION PROCESSING DEVICE FOR DETECTING A TRACE FORMED ON A SURFACE OF A WORKPIECE

BACKGROUND

1. Technical Field

The present disclosure relates to an information processing method and an information processing device for detecting a trace formed on a surface of a workpiece.

2. Description of the Related Art

A manufacturing line for producing a workpiece includes a machining process of performing machining on the workpiece and an inspection process of inspecting an external appearance of the workpiece to which the machining is performed in the machining process. Japanese Patent Unexamined Publication No. 2004-153228 discloses a technique for specifying the cause of occurrence of a trace based on the inspection information in which the trace formed on a surface of the workpiece is detected in the inspection process.

SUMMARY

An information processing method according to an aspect of the present disclosure is an information processing method for detecting a trace formed on a surface of a workpiece in an inspection process of inspecting an external appearance of the workpiece by imaging the workpiece on which machining is performed by a machining process, the inspection process being included in a manufacturing line for producing the workpiece, the information processing method including: a step (a) of calculating, for each workpiece, a position of a feature corresponding to the trace in a first coordinate system defined with reference to a field of view of an image captured in the inspection process, when the feature corresponding to the trace is included in the image; a step (b) of calculating, for each workpiece, a position of the feature corresponding to the trace in a second coordinate system defined with reference to a position of the workpiece recorded in the image, when the feature corresponding to the trace is included in the image; a step (c) of calculating a size of a first distribution of the position of the feature corresponding to the trace in the first coordinate system and a size of a second distribution of the position of the feature corresponding to the trace in the second coordinate system; and a step (d) of outputting information indicating that the feature corresponding to the trace is the trace formed on the surface of the workpiece in the machining process, when a difference between the size of the first distribution and the size of the second distribution exceeds a first predetermined value, and outputting information indicating that the feature corresponding to the trace is a false detection of the trace in the inspection process, when the difference between the size of the first distribution and the size of the second distribution is equal to or less than the first predetermined value.

BRIEF DESCRIPTION OF THE DRAWINGS

FIG. 7 is a diagram showing an example of position coordinate information stored in a database.

DETAILED DESCRIPTION

Figure 1:
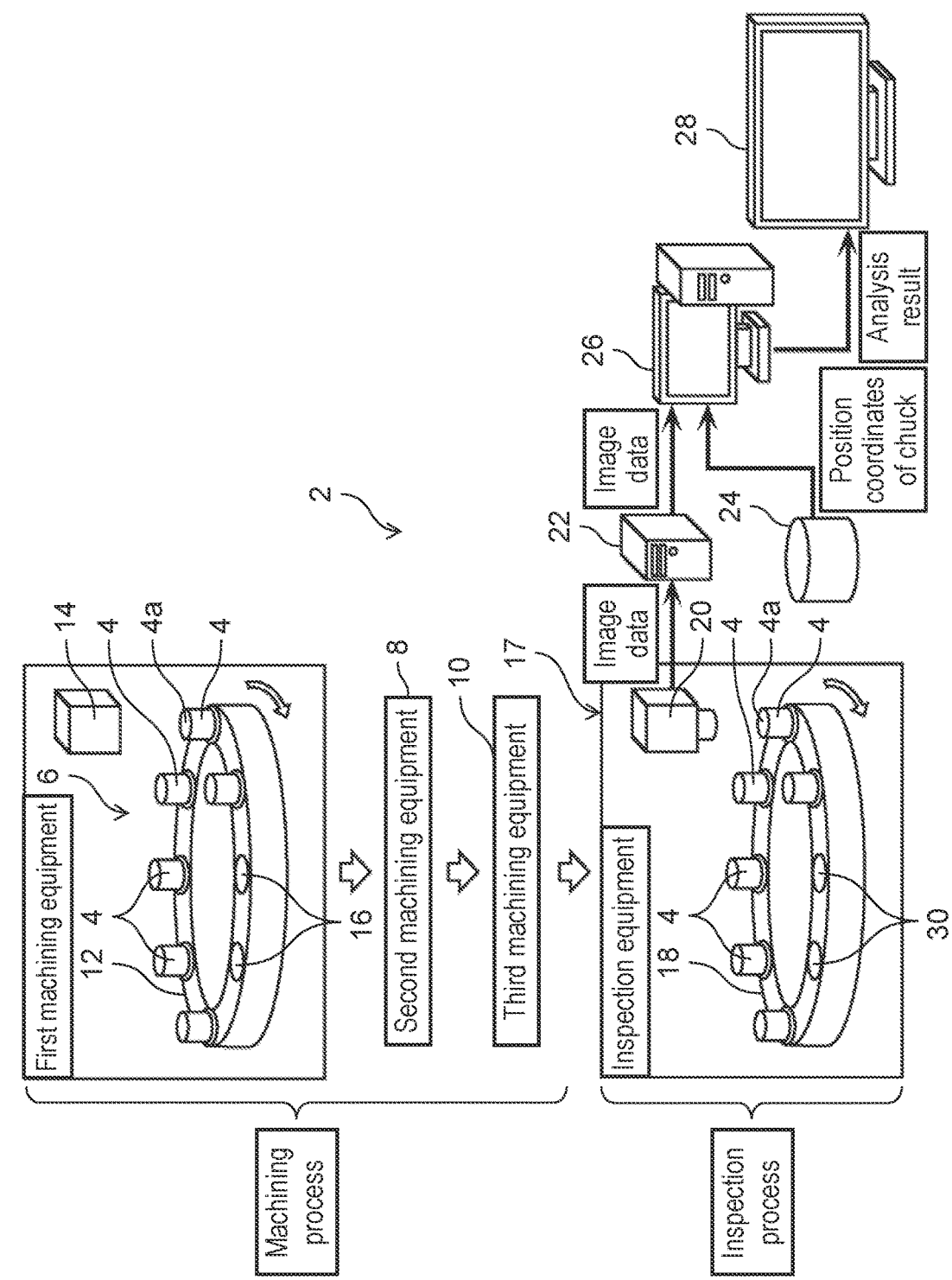
FIG. 1 is a diagram showing a concept of a manufacturing line according to an Exemplary Embodiment.

In the technique in the related art disclosed in Japanese Patent Unexamined Publication No. 2004-153228, it is not possible to clearly distinguish between a trace generated in the machining process and a false detection of a trace in the inspection process.

An object of the present disclosure is to provide an information processing method and an information processing device capable of clearly distinguishing between a trace generated in a machining process and a false detection of a trace in an inspection process.

An information processing method according to an aspect of the present disclosure is an information processing method for detecting a trace formed on a surface of a workpiece in an inspection process of inspecting an external appearance of the workpiece by imaging the workpiece on which machining is performed by a machining process, the inspection process being included in a manufacturing line for producing the workpiece, the information processing method including: a step (a) of calculating, for each workpiece, a position of a feature corresponding to the trace in a first coordinate system defined with reference to a field of view of an image captured in the inspection process, when the feature corresponding to the trace is included in the image; a step (b) of calculating, for each workpiece, a position of the feature corresponding to the trace in a second coordinate system defined with reference to a position of the workpiece recorded in the image, when the feature corresponding to the trace is included in the image; a step (c) of calculating a size of a first distribution of the position of the feature corresponding to the trace in the first coordinate system and a size of a second distribution of the position of the feature corresponding to the trace in the second coordinate system; and a step (d) of outputting information indicating that the feature corresponding to the trace is the trace formed on the surface of the workpiece in the machining process, when a difference between the size of the first distribution and the size of the second distribution exceeds a first predetermined value, and outputting information indicating that the feature corresponding to the trace is a false detection of the trace in the inspection process, when the difference between the size of the first distribution and the size of the second distribution is equal to or less than the first predetermined value.

According to the present aspect, it is possible to clearly distinguish between a trace generated in the machining process and a false detection of a trace in the inspection process. As a result, the accuracy of the external appearance inspection of the workpiece in the inspection process can be improved.

For example, in the machining process, first machining equipment that performs first machining on the workpiece in a holding state of the workpiece may be used, the information processing method may further include a step (e) of calculating a first difference which is a difference between the position of the feature corresponding to the trace in the second coordinate system and a holding position of the workpiece by the first machining equipment in the second coordinate system, and in the step (d), when the difference between the size of the first distribution and the size of the second distribution exceeds the first predetermined value and the first difference is equal to or less than a second predetermined value, information indicating that the trace is generated due to holding of the workpiece by the first machining equipment may be output.

According to the present aspect, it can be specified that the generation factor of the trace is due to the holding of the workpiece by the first machining equipment.

For example, in the machining process, second machining equipment that performs second machining on the workpiece in the holding state of the workpiece may be further used, the information processing method may further include a step (f) of calculating a second difference which is a difference between the position of the feature corresponding to the trace in the second coordinate system and a holding position of the workpiece by the second machining equipment in the second coordinate system, and in the step (d), when the difference between the size of the first distribution and the size of the second distribution exceeds the first predetermined value, the first difference is smaller than the second difference, and the first difference is equal to or less than the second predetermined value, information indicating that the trace is generated due to the holding of the workpiece by the first machining equipment may be output.

According to the present aspect, when the generation factor of the trace is due to the holding of the workpiece by any of the plurality of machining equipment included in the machining process, the machining equipment that becomes the generation factor of the trace can be accurately specified.

For example, in the step (c), after the size of the second distribution is calculated, the size of the first distribution may be calculated by using a calculation result of the size of the second distribution.

According to the present aspect, after the size of the second distribution is calculated, it is possible to easily compare the size of the first distribution with the size of the second distribution by calculating the size of the first distribution by using the calculation result of the size of the second distribution.

An information processing device according to another aspect of the present disclosure is an information processing device for detecting a trace formed on a surface of a workpiece in an inspection process of inspecting an external appearance of the workpiece by imaging the workpiece machined by a machining process, the inspection process being included in a manufacturing line for producing the workpiece, the information processing device includes: a processor; and a memory in which a program that is executable by the processor is stored, in which by using the program stored in the memory, the processor calculates, for each workpiece, a position of a feature corresponding to the trace in a first coordinate system defined with reference to a field of view of an image captured in the inspection process, when the feature corresponding to the trace is included in the image, calculates, for each workpiece, a position of the feature corresponding to the trace in a second coordinate system defined with reference to a position of the workpiece recorded in the image, when the feature corresponding to the trace is included in the image, calculates a size of a first distribution of the position of the feature corresponding to the trace in the first coordinate system and a size of a second distribution of the position of the feature corresponding to the trace in the second coordinate system, outputs information indicating that the feature corresponding to the trace is the trace formed on the surface of the workpiece in the machining process, when a difference between the size of the first distribution and the size of the second distribution exceeds a predetermined value, and outputs information indicating that the feature corresponding to the trace is a false detection of the trace in the inspection process, when the difference between the size of the first distribution and the size of the second distribution is equal to or less than the predetermined value.

According to the present aspect, it is possible to clearly distinguish between a trace generated in the machining process and a false detection of a trace in the inspection process. As a result, the accuracy of the external appearance inspection of the workpiece in the inspection process can be improved.

The general or specific aspects of the present disclosure may be realized by a recording medium such as a system, a method, an integrated circuit, a computer program, or a computer-readable CD-ROM, or may be realized by any combination of the system, the method, the integrated circuit, the computer program, or the recording medium.

Hereinafter, Exemplary Embodiments will be specifically described with reference to the drawings.

Each of the Exemplary Embodiments described below shows a comprehensive or specific example. Numerical values, shapes, materials, constituent elements, arrangement positions and connection forms of the constituent elements, steps, order of steps, and the like shown in the following exemplary embodiments are merely examples and do not limit the present disclosure. Thereby, among the constituent elements in the following exemplary embodiment, the constituent elements that are not described in the independent claims indicating the highest concept are described as any constituent elements.

Exemplary Embodiment

1. Outline of Manufacturing Line

First, the outline of manufacturing line 2 according to the Exemplary Embodiment will be described with reference to FIG. 1. FIG. 1 is a diagram showing a concept of manufacturing line 2 according to the Exemplary Embodiment.

As shown in FIG. 1, manufacturing line 2 is a manufacturing line for producing workpiece 4 and includes a machining process and an inspection process. Workpiece 4 is, for example, a capacitor having a substantially cylindrical shape.

In the machining process, for example, the first machining, the second machining, and the third machining are performed on workpiece 4 in this order. In the machining process, first machining equipment 6, second machining equipment 8, and third machining equipment 10 are used.

First machining equipment 6 includes first transporting device 12 that transports workpiece 4, and first machining device 14 that performs the first machining on workpiece 4 transported by first transporting device 12. A plurality of chucks 16 for holding workpiece 4 are disposed in first transporting device 12.

Although not shown, second machining equipment 8 includes a second transporting device that transports workpiece 4 and a second machining device that performs the second machining on workpiece 4 transported by the second transporting device. A plurality of chucks for holding workpiece 4 are disposed in the second transporting device. A holding position of workpiece 4 by the chuck of the second transporting device is different from a holding position of workpiece 4 by chuck 16 of first transporting device 12.

Although not shown, third machining equipment 10 includes a third transporting device for transporting workpiece 4 and a third machining device for performing the third machining on workpiece 4 transported by the third transporting device. A plurality of chucks for holding workpiece 4 are disposed in the third transporting device. A holding position of workpiece 4 by the chuck of the third transporting device is different from the holding position of workpiece 4 by chuck 16 of first transporting device 12, and is different from the holding position of workpiece 4 by the chuck of the second transporting device.

In the inspection process, inspection equipment 17 for inspecting an external appearance of workpiece 4 is used by imaging workpiece 4 on which the first machining, the second machining, and the third machining are performed in the machining process. Inspection equipment 17 includes transporting device 18, camera 20, server 22 for storage, database 24, terminal 26 for analysis (an example of an information processing device), and display 28 for analysis result display.

Transporting device 18 is a device for sequentially transporting workpiece 4 to an imaging region directly below camera 20. A plurality of chucks 30 for holding workpiece 4 are disposed in transporting device 18.

Camera 20 is disposed above transporting device 18, and images workpiece 4 transported by transporting device 18. In the present Exemplary Embodiment, camera 20 images top surface 4a of workpiece 4 having a circular shape. Camera 20 outputs image data indicating imaged workpiece 4 to server 22 for storage.

A plurality of image data from camera 20 are stored in server 22 for storage.

Database 24 stores position coordinate information indicating each of position coordinates (that is, the holding position of workpiece 4 by each chuck) of chuck 16 of first machining equipment 6, the chuck of second machining equipment 8, and the chuck of third machining equipment 10, in advance.

Terminal 26 for analysis detects a trace formed on a surface (top surface 4a) of each workpiece 4 by analyzing the plurality of image data stored in server 22 for storage. In the present specification, the trace means a dent, a scratch, a stain, or the like formed on the surface of workpiece 4 when workpiece 4 is held by any of chuck 16 of first machining equipment 6, the chuck of second machining equipment 8, and the chuck of third machining equipment 10.

When terminal 26 for analysis detects a trace formed on the surface of workpiece 4, terminal 26 for analysis specifies the machining equipment that becomes a generation factor of the trace among first machining equipment 6, second machining equipment 8, and third machining equipment 10 by referring to database 24. Terminal 26 for analysis outputs information indicating the analysis result to display 28 for analysis result display.

Terminal 26 for analysis is constituted by, for example, a personal computer or the like. Terminal 26 for analysis is constituted by a processor and a memory and executes various processes by causing the processor to read and execute a software program stored in the memory.

Display 28 for analysis result display is a display for displaying the analysis result from terminal 26 for analysis.

2. Overall Flow of Manufacturing Line

Figure 2:
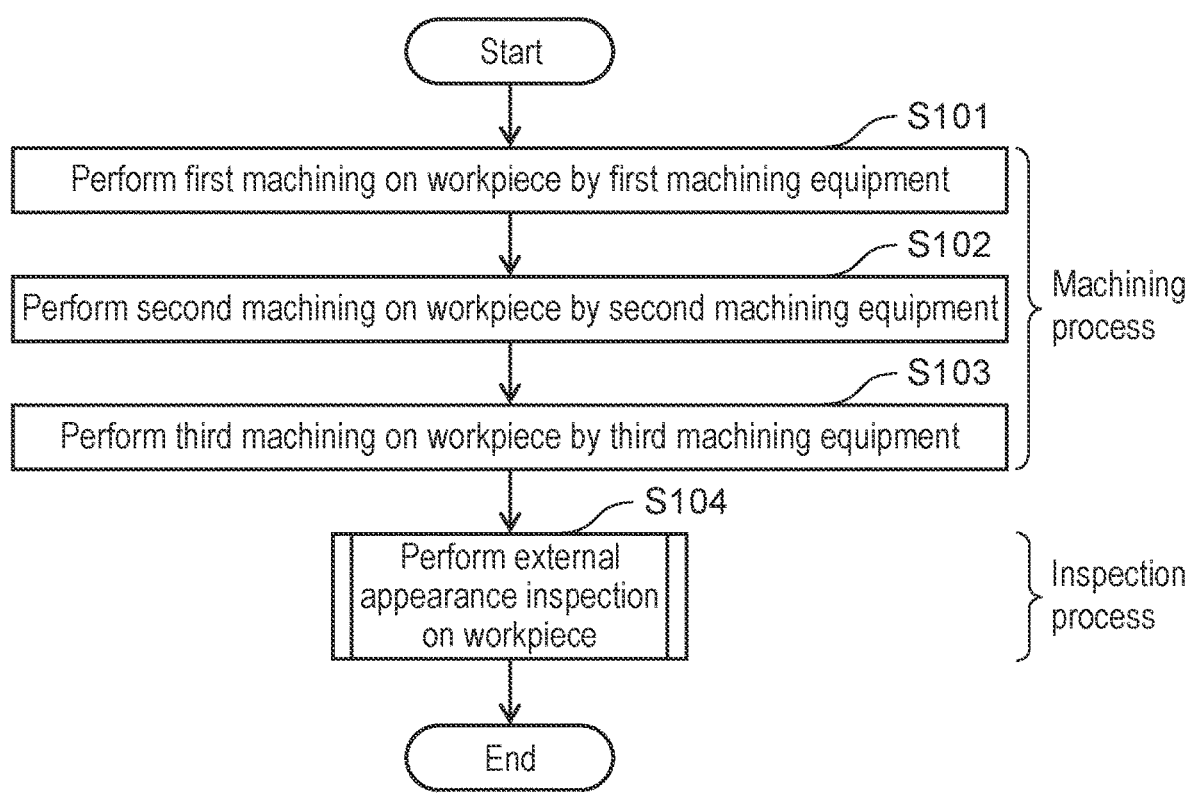
FIG. 2 is a flowchart showing an overall flow of the manufacturing line according to the Exemplary Embodiment.

Next, the entire flow of manufacturing line 2 according to the Exemplary Embodiment will be described with reference to FIG. 2. FIG. 2 is a flowchart showing an overall flow of manufacturing line 2 according to the Exemplary Embodiment.

As shown in FIG. 2, first, the first machining is performed on workpiece 4 by first machining equipment 6 (S101). Specifically, the first machining is performed with respect to workpiece 4 that is held by chuck 16 of first transporting device 12 by first machining device 14.

After that, the second machining is performed on workpiece 4 by second machining equipment 8 (S102). Specifically, the second machining is performed with respect to workpiece 4 that is held by the chuck of the second transporting device by the second machining device.

After that, the third machining is performed on workpiece 4 by third machining equipment 10 (S103). Specifically, the third machining is performed with respect to workpiece 4 that is held by the chuck of the third transporting device by the third machining device.

Finally, the external appearance inspection is performed on workpiece 4 by inspection equipment 17 (S104).

As described above, the machining process is performed in steps S101 to S103, and then the inspection process is performed in step S104.

3. Inspection Process Flow

Figure 3:
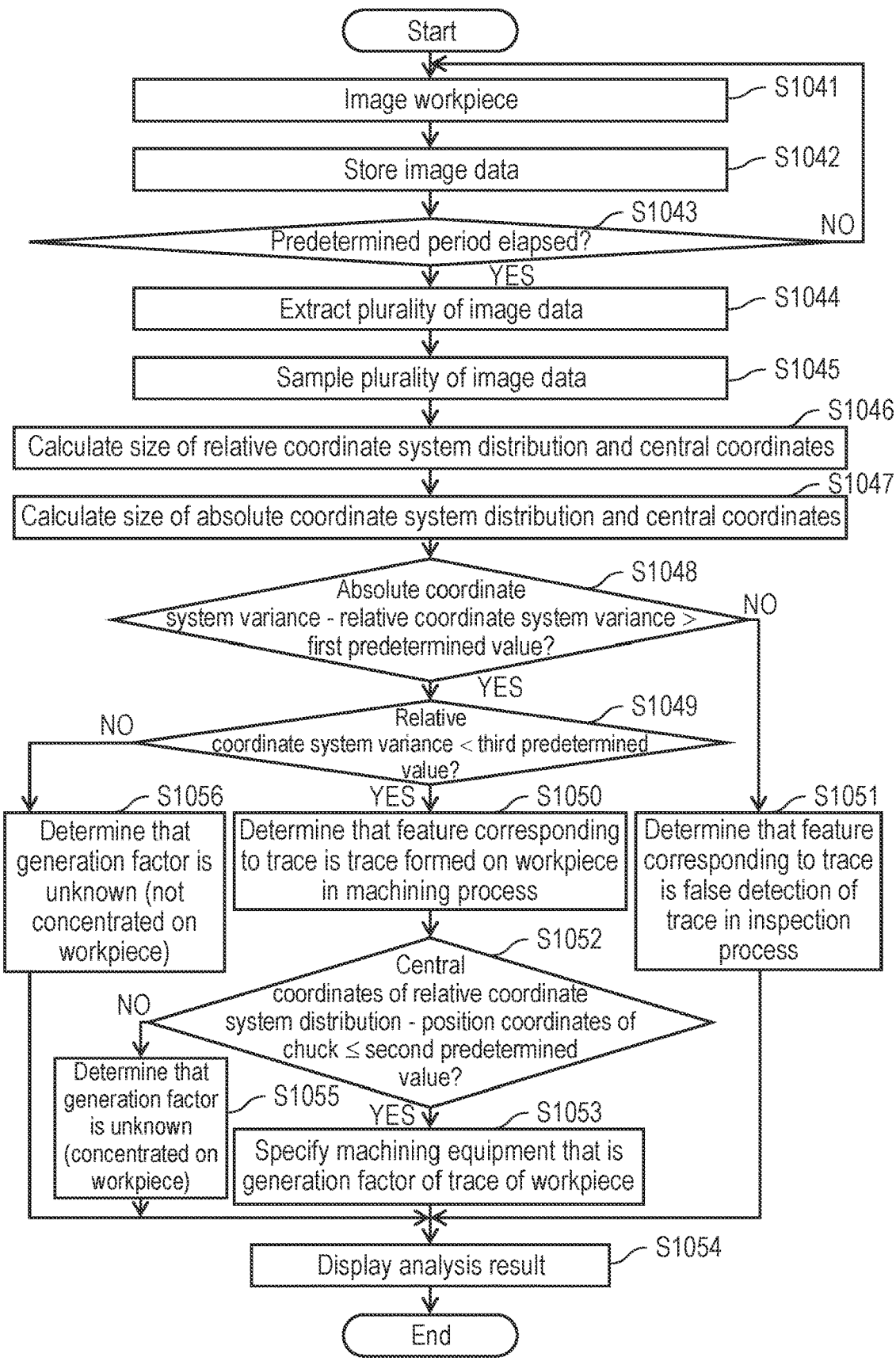
FIG. 3 is a flowchart specifically showing the contents of step S104 (inspection process) in FIG. 2.
Figure 4:
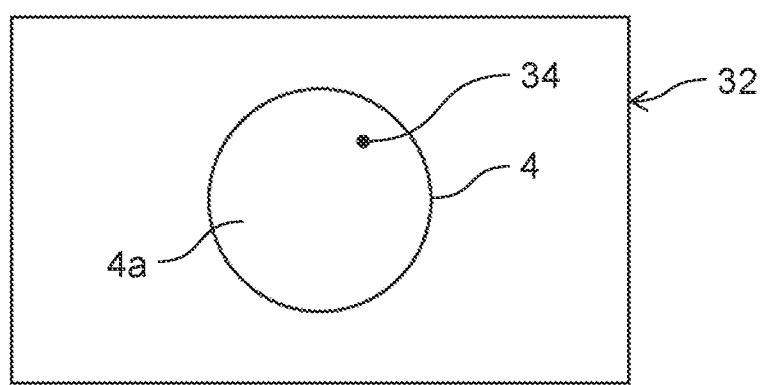
FIG. 4 is a diagram showing an example of an image of a workpiece captured by a camera in the inspection process.
Figure 5:
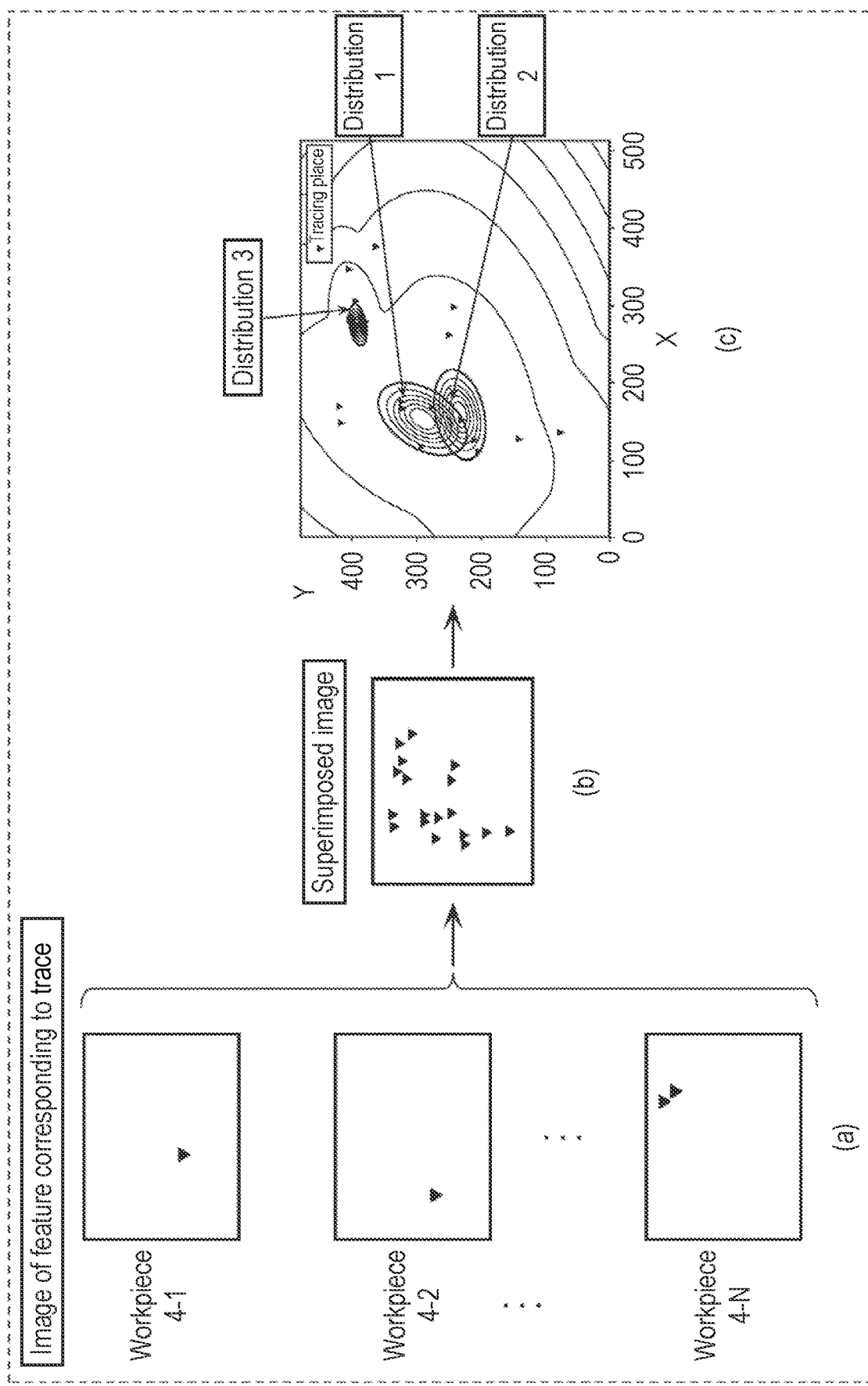
FIG. 5 is a diagram for describing the contents of step S1045 of the flowchart in FIG. 3.
Figure 6:
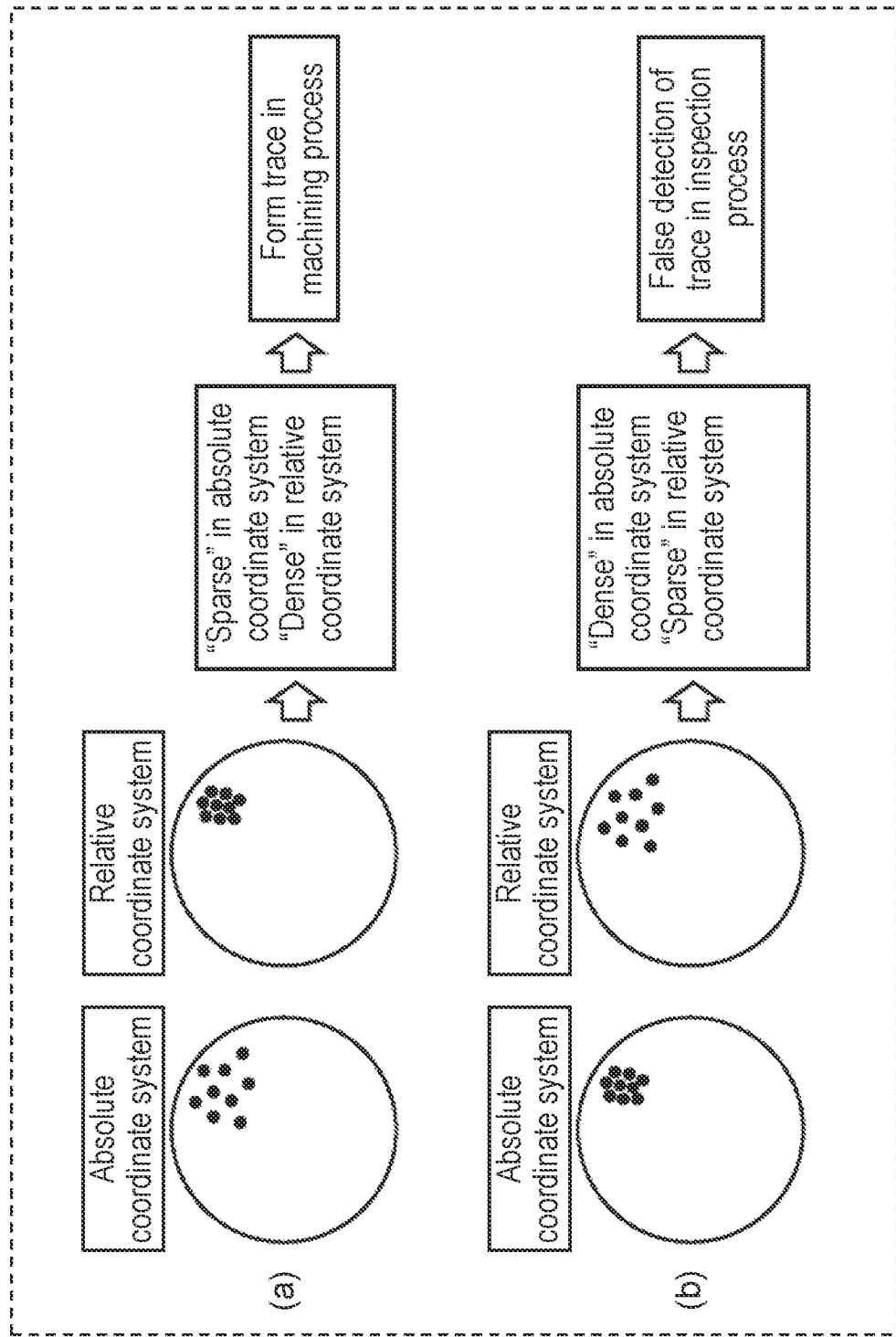
FIG. 6 is a diagram for describing the contents of steps S1050 and S1051 of the flowchart in FIG. 3.

Next, the flow of the inspection process will be described in detail with reference to FIGS. 3 to 7. FIG. 3 is a flowchart specifically showing the contents of step S104 (inspection process) in FIG. 2. FIG. 4 is a diagram showing an example of image 32 of workpiece 4 captured by camera 20 in the inspection process. FIG. 5 is a diagram for describing the contents of step S1045 of the flowchart in FIG. 3. FIG. 6 is a diagram for describing the contents of steps S1050 and S1051 of the flowchart in FIG. 3. FIG. 7 is a diagram showing an example of position coordinate information stored in database 24.

As shown in FIG. 3, in the inspection process, first, workpiece 4 which is a target of the external appearance inspection, is imaged by camera 20 (S1041). In the example shown in FIG. 4, top surface 4a of workpiece 4 is recorded in image 32 captured by camera 20, and feature 34 (for example, a black dot) corresponding to the trace is included on top surface 4a of workpiece 4. Feature 34 that corresponds to the trace is an image like feature included in image 32, which may be a trace formed on top surface 4a of workpiece 4.

Camera 20 outputs the image data indicating captured image 32 to server 22 for storage. Server 22 for storage stores the image data from camera 20 (S1042). When a predetermined period (for example, 2 hours) does not elapse from the start of the external appearance inspection (or the previous extraction of a plurality of image data by the terminal 26 for analysis) (NO in S1043), the process returns to step S1041 described above.

When the predetermined period elapses from the start of the external appearance inspection (or the previous extraction of the plurality of image data by the terminal 26 for analysis) (YES in S1043), terminal 26 for analysis extracts the plurality of image data stored in server 22 for storage by accessing server 22 for storage (S1044). Terminal 26 for analysis performs a sampling of the extracted plurality of image data (S1045). That is, terminal 26 for analysis performs a sampling of the extracted plurality of image data at a predetermined time interval (for example, 2 hours interval).

Specifically, as shown in (a) and (b) of FIG. 5, terminal 26 for analysis performs the sampling of the plurality of image data by superimposing the coordinate data of the features (indicated by the black triangular dots in (a) and (b) of FIG. 5) corresponding to the traces included in each of the plurality of image data obtained by imaging each of the plurality of workpieces 4 (workpiece 4-1 to workpiece 4-N). As a result of the sampling, by superimposing the features corresponding to the traces contained in each of the plurality of image data, a distribution of the positions of the features corresponding to the traces is formed.

As a result, terminal 26 for analysis calculates the position of the feature corresponding to the trace in a relative coordinate system (an example of a second coordinate system). The relative coordinate system is a coordinate system defined with reference to the position of workpiece 4 (that is, the outline of workpiece 4) recorded in image 32 (see FIG. 4) captured by camera 20. Terminal 26 for analysis calculates the size (variance) of the relative coordinate system distribution (an example of the second distribution), which is the distribution of the positions of the features corresponding to the traces in the relative coordinate system, and the central coordinates of the relative coordinate system distribution (S1046).

In the relative coordinate system, in a case where the outer form of workpiece 4 is a symmetrical figure form such as a circle or a square form, for example, when an absolute coordinate system (described later) is a perpendicular coordinate system, the same perpendicular coordinate system as the absolute coordinate system may be set, and an original point position may be set as the center point of the symmetrical figure form. Alternatively, in the polar coordinate system, an axis in the radius direction may be defined based on the printing information of the surface of workpiece 4 or the like.

For the calculation of the size of the distribution by terminal 26 for analysis, for example, a Gaussian mixture model (GMM) can be applied. The Gaussian mixture model is a method of approximating a certain probability distribution by a linear combination of a Gaussian function when the certain probability distribution is given. In this Gaussian mixture model, when considered in two dimensions, a Gaussian function (normal distribution), which is the k-th Gaussian function and has an average value of X $\mu x\_k$, an average value of Y $\mu y\_k$, a variance of X $\Sigma x\_k$, a variance of Y $\Sigma y\_k$, and a covariance of XY $\Sigma xy\_k$, is combined with weight $\pi k$. The size of each distribution can be easily handled by $\Sigma y\_k + \Sigma x\_k$.

Regarding the number of local distributions, which is a hyperparameter in the Gaussian mixture model, it is possible to automatically analyze the features corresponding to the traces that are locally concentrated in the image without assuming various assumptions, by analyzing the Gaussian mixture model while changing the number of local distributions and using a flow that adopts the number of local distributions at which the Akaike's information criterion (AIC) or the Bayesian information criterion (BIC) is minimized, for example.

Returning to the flowchart in FIG. 3, after step S1046, terminal 26 for analysis calculates the position of the feature corresponding to the trace in the absolute coordinate system (an example of the first coordinate system). The absolute coordinate system is a coordinate system defined with reference to a field of view (that is, the outline of entire image 32) of image 32 (see FIG. 4) captured by camera 20. By using the calculation results of the size of the relative coordinate system distribution and the central coordinates in step S1046, terminal 26 for analysis calculates the size (variance) of the absolute coordinate system distribution (an example of the first distribution), which is the distribution of the positions of the features corresponding to the traces in the absolute coordinate system, and the central coordinates of the absolute coordinate system distribution (S1047).

Specifically, for a coordinate group determined to belong to the k-th Gaussian function as a result of applying the Gaussian mixture model with respect to the relative coordinate system, the average value of X $\mu x\_k$, the average value of Y $\mu y\_k$, the variance of X $\Sigma x\_k$, the variance of Y $\Sigma y\_k$, and the covariance of XY $\Sigma xy\_k$, in the absolute coordinates, are calculated by simple aggregation.

When the Gaussian mixture model is individually applied to each of the absolute coordinate system and the relative coordinate system in which the local concentration modes of the features corresponding to the traces are different, since the distribution information (distribution size and central coordinates) that does not have a sense of unity may be respectively calculated, it is difficult to compare the both. Therefore, it is preferable to first apply the Gaussian mixture model to one of the absolute coordinate system and the relative coordinate system to calculate the distribution information and then, by using the calculated distribution information, calculate the distribution information related to the other of the absolute coordinate system and the relative coordinate system without applying the Gaussian mixture model.

In the relative coordinate system, although a conversion error from the absolute coordinate system to the relative coordinate system causes variations in the coordinates, basically, the generation of the trace with reference to workpiece 4 that is desired to be a target tends to be concentrated, and it is easy to apply the Gaussian mixture model. On the other hand, in the absolute coordinate system, the transport variation of workpiece 4 causes variation in the coordinates, and it is not easy to apply the Gaussian mixture model. Therefore, in the present Exemplary Embodiment, after applying the Gaussian mixture model with respect to the relative coordinate system to calculate the distribution information, the distribution information is calculated based on the distribution information related to the relative coordinate system, with respect to the absolute coordinate system to which the Gaussian mixture model is not applied. As a result, it is possible to compare the distribution information related to the absolute coordinate system and the distribution information related to the relative coordinate system. Depending on a relative relationship between the transport variation of workpiece 4 and the conversion variation from the absolute coordinate system to the relative coordinate system, contrary to the above, after applying the Gaussian mixture model with respect to the absolute coordinate system to calculate the distribution information, the distribution information may be calculated based on the distribution information related to the absolute coordinate system, with respect to the relative coordinate system to which the Gaussian mixture model is not applied.

As shown in (c) of FIG. 5, the distributions of the positions of the features corresponding to the traces (distributions 1 to 3) are displayed in an elliptical shape. This elliptical shape is a contour line for which the Gaussian mixture density is calculated by adding the k Gaussian distributions that are calculated based on the Gaussian mixture model and the Gaussian mixture density are connected with a predetermined density. The predetermined density is often adopted on a logarithmic scale at equal intervals, for example, by connecting the Gaussian mixture density with the predetermined densities such as $10^{0.333}$, $10^{0.663}$ and $10^{1.000}$, the Gaussian mixture distribution is displayed in an intuitive and easy-to-understand manner. The size of the distribution is the size of the approximate distribution calculated with the standard deviations σx_k and σy_k taking the positive square root of each of the variance of X Σx_k and the variance of Y Σy_k of the k-th Gaussian function corresponding to each elliptical shape shown in (c) of FIG. 5, as $(σx\_k^2+σy\_k^2)^{0.5}$, and a threshold value is substantially several hundred μm. When the size of the distribution is less than the threshold value, it is defined as "dense", and when it is equal to or greater than the threshold value, it is defined as "sparse", and then as will be described later, the size of the absolute coordinate system distribution and the size of the relative coordinate system distribution are compared.

Returning to the flowchart in FIG. 3, after step S1047, terminal 26 for analysis determines whether or not a difference between the size (the absolute coordinate system variance) of the absolute coordinate system distribution calculated in step S1047 and the size (the relative coordinate system variance) of the relative coordinate system distribution calculated in step S1046 exceeds a first predetermined value (for example, "0") (S1048).

When the difference between the size of the absolute coordinate system distribution and the size of the relative coordinate system distribution exceeds the first predetermined value (YES in S1048), terminal 26 for analysis further determines whether or not the size of the relative coordinate system distribution is less than a third predetermined value (for example, several hundred μm) (S1049). When the size of the relative coordinate system distribution is less than the third predetermined value (YES in S1049), terminal 26 for analysis determines that the feature corresponding to the trace is the trace formed on top surface 4a of workpiece 4 in the machining process (S1050).

Returning to step S1048, when the difference between the size of the absolute coordinate system distribution and the size of the relative coordinate system distribution is equal to or less than the first predetermined value (NO in S1048), terminal 26 for analysis determines that the feature corresponding to the trace is a false detection of the trace in the inspection process (S1051).

Since the position of camera 20 in inspection equipment 17 is fixed, when workpiece 4 existing in the fixed imaging region is imaged by camera 20, due to the transport variation of workpiece 4, the position of workpiece 4 varies within the fixed angle of camera 20.

When the traces are formed on top surface 4a of workpiece 4, the traces are concentrated at a specific position on top surface 4a of workpiece 4. On the other hand, when foreign matter attaches to a specific position on the lens of camera 20, the traces are concentrated on the specific position on the fixed angle of camera 20.

That is, as shown in (a) of FIG. 6, it can be estimated that the possibility that the foreign matters are attached to specific positions on the lens of camera 20 is low when the distribution of the positions of the features corresponding to the traces in the absolute coordinate system, which is camera 20 reference, is "sparse", and it can be estimated that the possibility that the traces are formed at specific positions on top surface 4a of workpiece 4 is high when the distribution of the positions of the features corresponding to the traces in the relative coordinate system, which is workpiece 4 reference, is "dense". This is because it is considered that the absolute coordinate system distribution becomes "sparse" and the relative coordinate system distribution becomes "dense" when the transport variation of workpiece 4 is generated in a state in which the traces are formed at the specific positions on top surface 4a of workpiece 4.

Therefore, when the absolute coordinate system distribution is "sparse" and the relative coordinate system distribution is "dense", in other words, when the difference between the size of the absolute coordinate system distribution and the size of the relative coordinate system distribution exceeds the first predetermined value and the size of the relative coordinate system distribution is less than the third predetermined value, terminal 26 for analysis determines that the features corresponding to the traces are the traces formed on top surface 4a of workpiece 4 in the machining process.

On the other hand, as shown in (b) of FIG. 6, it can be estimated that the possibility that the foreign matters are attached to specific positions on the lens of camera 20 is high when the distribution of the positions of the features corresponding to the traces in the absolute coordinate system, which is camera 20 reference, is "dense", and it can be estimated that the possibility that the traces are formed at specific positions on top surface 4a of workpiece 4 is low when the distribution of the positions of the features corresponding to the traces in the relative coordinate system, which is workpiece 4 reference, is "sparse". This is because it is considered that the absolute coordinate system distribution becomes "dense" and the relative coordinate system distribution becomes "sparse" when the transport variation of workpiece 4 is generated in a state in which the foreign matters are attached to the specific positions on the lens of camera 20.

Therefore, when the absolute coordinate system distribution is "dense" and the relative coordinate system distribution is "sparse", in other words, when the difference between the size of the absolute coordinate system distribution and the size of the relative coordinate system distribution is equal to or less than the first predetermined value, terminal 26 for analysis determines that the features corresponding to the traces are false detections of the traces in the inspection process.

Returning to the flowchart in FIG. 3, after step S1050, by referring to the position coordinate information stored in database 24, terminal 26 for analysis compares the central coordinates (that is, the position of the feature corresponding to the trace) of the relative coordinate system distribution with each position coordinates (that is, the holding position of workpiece 4 by each chuck in the relative coordinate system) of chuck 16 of first machining equipment 6, the chuck of second machining equipment 8, and the chuck of third machining equipment 10 in the relative coordinate system, respectively. Specifically, terminal 26 for analysis determines whether or not the difference between the central coordinates of the relative coordinate system distribution and the position coordinates of the chuck is equal to or less than a second predetermined value (for example, 1 mm) (S1052). When the difference between the central coordinates of the relative coordinate system distribution and the position coordinates of the chuck is equal to or less than the second predetermined value (YES in S1052), based on the above comparison result, terminal 26 for analysis specifies the machining equipment that is the generation factor of the trace formed on top surface 4a of workpiece 4 (S1053).

The position coordinate information is, for example, a data table as shown in FIG. 7. In the example shown in FIG. 7, in a first line of the position coordinate information, the position coordinates (X, Y)=(10, 10) of chuck 16 of first machining equipment 6 in the relative coordinate system are stored. In the second line of the position coordinate information, the position coordinates (X, Y)=(100, 100) of the chuck of second machining equipment 8 in the relative coordinate system are stored. In the third line of the position coordinate information, the position coordinates (X, Y)= (150, 150) of the chuck of third machining equipment 10 in the relative coordinate system are stored.

For example, when the central coordinates of the relative coordinate system distribution are (X, Y)=(10,10), terminal 26 for analysis calculates a first difference ($\Delta X1$, $\Delta Y1$) which is a difference between the central coordinates of the relative coordinate system distribution and the position coordinates of chuck 16 of first machining equipment 6 in the relative coordinate system. Further, terminal 26 for analysis calculates a second difference ($\Delta X2$, $\Delta Y2$) which is a difference between the central coordinates of the relative coordinate system distribution and the position coordinates of the chuck of second machining equipment 8 in the relative coordinate system. Terminal 26 for analysis calculates a third difference ($\Delta X3$, $\Delta Y3$) which is a difference between the central coordinates of the relative coordinate system distribution and the position coordinates of the chuck of third machining equipment 10 in the relative coordinate system.

Terminal 26 for analysis specifies the smallest first difference from the calculated first difference, second difference, and third difference. For example, in the above example, the first difference is (0,0). The second difference is (90, 90). The third difference is (140,140). The first difference is smaller than the second difference. The first difference is smaller than the third difference. When the specified first difference (each of $\Delta X1$ and $\Delta Y1$) is equal to or less than the second predetermined value, terminal 26 for analysis specifies first machining equipment 6 as the machining equipment that is the generation factor of the trace and determines that the generation factor of the traces are generated due to the holding of workpiece 4 by first machining equipment 6.

Returning to the flowchart in FIG. 3, after step S1053, the analysis result from terminal 26 for analysis is displayed on display 28 for analysis result display (S1054). As a result, display 28 for analysis result display displays information indicating that the traces are formed on top surface 4*a* of workpiece 4 due to the holding by chuck 16 of first machining equipment 6.

Returning to step S1052, when the difference between the central coordinates of the relative coordinate system distribution and the position coordinates of the chuck exceeds the second predetermined value (NO in S1052), terminal 26 for analysis determines that the generation factor of the feature corresponding to the trace is unknown (concentrated on workpiece 4) (S1055). After that, display 28 for analysis result display displays information, as the analysis result from terminal 26 for analysis, indicating that the generation factor of the feature corresponding to the trace is unknown (S1054).

When the process returns to step S1048 and proceeds from step S1048 to step S1051, display 28 for analysis result display displays the analysis result from terminal 26 for analysis (S1054) in the same manner as described above. As a result, display 28 for analysis result display displays information indicating that the false detection of the trace occurred due to the foreign matter attached to the lens of camera 20.

Return to step S1048, when the difference between the size of the absolute coordinate system distribution and the size of the relative coordinate system distribution exceeds the first predetermined value (YES in S1048), and when the size of the relative coordinate system distribution is equal to or greater than the third predetermined value (NO in S1049), terminal 26 for analysis determines that the generation factor of the feature corresponding to the trace is unknown (not concentrated on workpiece 4) (S1056). This is because when the size of the relative coordinate system distribution is equal to or greater than the third predetermined value (that is, the relative coordinate system distribution is "sparse"), the evaluation with the Gaussian mixture model may be inappropriate, and the generation factor of the feature corresponding to the trace cannot be appropriately determined. After that, display 28 for analysis result display displays information, as the analysis result from terminal 26 for analysis, indicating that the generation factor of the feature corresponding to the trace is unknown (S1054).

4. Effects

As described above, in the present Exemplary Embodiment, when the difference between the size of the absolute coordinate system distribution and the size of the relative coordinate system distribution exceeds the first predetermined value, terminal 26 for analysis determines that the feature corresponding to the trace is the trace formed on top surface 4*a* of workpiece 4 in the machining process. On the other hand, when the difference between the size of the absolute coordinate system distribution and the size of the relative coordinate system distribution is equal to or less than the first predetermined value, terminal 26 for analysis determines that the feature corresponding to the trace is a false detection of the trace in the inspection process.

Thereby, it is possible to clearly distinguish between a trace generated in the machining process and a false detection of a trace in the inspection process. As a result, the accuracy of the external appearance inspection of workpiece 4 in the inspection process can be improved.

Other Modification Example

Although the information processing method and the information processing device according to one or more aspects have been described above based on the above-described Exemplary Embodiment, the present disclosure is not limited to the above-described Exemplary Embodiment. As long as it does not deviate from the gist of the present disclosure, a form in which various modifications conceived by those skilled in the art are applied to the Exemplary Embodiment, or a form constructed by combining constituent elements in different Exemplary Embodiments may also be included within the scope of one or more embodiments.

In the above Exemplary Embodiment, the case where workpiece 4 is a capacitor has been described, but the present disclosure is not limited to this, and for example, it may be various electronic components such as resistors or inductors or may be metal machined products such as automobile components.

In the above Exemplary Embodiment, each constituent element may be configured with dedicated hardware or may be realized by executing a software program suitable for each constituent element. Each constituent element may be realized by a program executor such as a CPU or a processor reading and executing a software program recorded on a recording medium such as a hard disk or a semiconductor memory.

A part or all of the functions of the information processing device according to the above Exemplary Embodiment may be realized by executing a program by a processor such as a CPU.

A part or all of the constituent elements constituting each of the above devices may be constituted by an IC card or a single module that can be attached to and detached from each device. The IC card or the module is a computer system constituted by a microprocessor, a ROM, a RAM, and the like. The IC card or the module may include the above-mentioned super multifunctional LSI. When the microprocessor operates according to a computer program, the IC card or the module achieves the function thereof. This IC card or this module may have tamper resistance.

The present disclosure may be the method shown above. It may be a computer program that realizes these methods by a computer, or it may be a digital signal composed of the computer program. In the present disclosure, the computer program or the digital signal may be recorded on a computer-readable recording medium, for example, a flexible disc, a hard disk, a CD-ROM, an MO, a DVD, a DVD-ROM, a DVD-RAM, a Blu-ray (registered trademark) disc (BD), a semiconductor memory, or the like. It may be the digital signal recorded on these recording media. In the present disclosure, the computer program or the digital signal may be transmitted via a telecommunication line, a wireless or wired communication line, a network typified by the Internet, data broadcasting, or the like. The present disclosure relates to a computer system including a microprocessor and a memory, in which the memory stores the computer program, and the microprocessor may operate according to the computer program. Further, it may be carried out by another independent computer system by recording the program or the digital signal on the recording medium and transferring the program or the digital signal, or by transferring the program or the digital signal via the network or the like.

The information processing method according to the present disclosure can be applied to an inspection process of inspecting the external appearance of a workpiece by, for example, imaging the workpiece.

What is claimed is:

1. An information processing method for detecting a trace formed on a surface of a workpiece among a plurality of workpieces included in an inspection process of inspecting an external appearance of the workpiece by imaging the workpiece on which machining is performed by a machining process, the inspection process being included in a manufacturing line for producing the plurality of workpieces, the information processing method comprising:
   a step (a) of extracting and sampling, for the workpiece, a plurality of image data captured by a camera;
   a step (b) of calculating, for the workpiece, a position of a feature corresponding to the trace in a first coordinate system defined with reference to a field of view of an image captured by the camera in the inspection process, when the feature corresponding to the trace is included in the image;
   a step (c) of calculating, for the workpiece, a position of the feature corresponding to the trace in a second coordinate system defined with reference to a position of the workpiece recorded in the image, when the feature corresponding to the trace is included in the image;
   a step (d) of calculating a size of a first distribution of the position of the feature corresponding to the trace in the first coordinate system and a size of a second distribution of the position of the feature corresponding to the trace in the second coordinate system; and
   a step (e) outputting to a display information indicating that the feature corresponding to the trace is the trace formed on the surface of the workpiece in the machining process, when a difference between the size of the first distribution and the size of the second distribution exceeds a first predetermined value, and
   outputting to the display information indicating that the feature corresponding to the trace is a false detection of the trace in the inspection process, when the difference between the size of the first distribution and the size of the second distribution is equal to or less than the first predetermined value.

2. The information processing method of claim 1,
   wherein in the machining process, first machining equipment that performs first machining on the workpiece in a holding state of the workpiece is used,
   the information processing method further comprises a step (f) of calculating a first difference which is a difference between the position of the feature corresponding to the trace in the second coordinate system and a holding position of the workpiece by the first machining equipment in the second coordinate system, and
   in the step (e), when the difference between the size of the first distribution and the size of the second distribution exceeds the first predetermined value and the first difference is equal to or less than a second predetermined value, information indicating that the trace is generated due to holding of the workpiece by the first machining equipment is output.

3. The information processing method of claim 2,
   wherein in the machining process, second machining equipment that performs second machining on the workpiece in the holding state of the workpiece is further used,
   the information processing method further comprises a step (g) of calculating a second difference which is a difference between the position of the feature corresponding to the trace in the second coordinate system and a holding position of the workpiece by the second machining equipment in the second coordinate system, and
   in the step (e), when the difference between the size of the first distribution and the size of the second distribution exceeds the first predetermined value, the first difference is smaller than the second difference, and the first difference is equal to or less than the second predetermined value, information indicating that the trace is generated due to the holding of the workpiece by the first machining equipment is output.

4. The information processing method of claim 1,
   wherein in the step (d), after the size of the second distribution is calculated, the size of the first distribution is calculated by using a calculation result of the size of the second distribution.

5. An information processing device for detecting a trace formed on a surface of a workpiece among a plurality of workpieces included in an inspection process of inspecting an external appearance of the workpiece by imaging the workpiece machined by a machining process, the inspection process being included in a manufacturing line for producing the plurality of workpieces, the information processing device comprising:
   a processor; and a memory in which a program that is executable by the processor is stored,
   wherein by using the program stored in the memory, the processor
   extracts and samples, for the workpiece, a plurality of image data captured by a camera;
   calculates, for the workpiece, a position of a feature corresponding to the trace in a first coordinate system defined with reference to a field of view of an image captured by the camera in the inspection process, when the feature corresponding to the trace is included in the image, calculates, for the workpiece, a position of the feature corresponding to the trace in a second coordinate system defined with reference to a position of the workpiece recorded in the image, when the feature corresponding to the trace is included in the image, calculates a size of a first distribution of the position of the feature corresponding to the trace in the first coordinate system and a size of a second distribution of the position of the feature corresponding to the trace in the second coordinate system, outputs to a display information indicating that the feature corresponding to the trace is the trace formed on the surface of the workpiece in the machining process, when a difference between the size of the first distribution and the size of the second distribution exceeds a predetermined value, and outputs to the display information indicating that the feature corresponding to the trace is a false detection of the trace in the inspection process, when the difference between the size of the first distribution and the size of the second distribution is equal to or less than the predetermined value.

* * * * *